United States Patent [19]

Bächler

[11] 3,969,042

[45] July 13, 1976

[54] TURBOMOLECULAR VACUUM PUMP HAVING A GAS BEARING-SUPPORTED ROTOR

[75] Inventor: Werner Bächler, Hoffnungsthal, Germany

[73] Assignee: Leybold-Heraeus GmbH & Co. KG, Cologne, Germany

[22] Filed: Nov. 25, 1974

[21] Appl. No.: 526,979

[30] Foreign Application Priority Data

Nov. 29, 1973 Germany............................ 2359456

[52] U.S. Cl................................ 417/354; 417/420; 417/424; 415/90; 415/112; 308/9
[51] Int. Cl.².................... F04B 35/04; F04D 29/20; F03B 5/00
[58] Field of Search .............. 415/90, 112; 417/353, 417/424, 420, 354; 308/9

[56] References Cited
UNITED STATES PATENTS

| | | |
|---|---|---|
| 3,168,977 | 2/1965 | Garnier et al...................... 415/90 X |
| 3,545,338 | 12/1970 | Lucien................................. 91/507 |
| 3,570,191 | 3/1971 | Williams............................ 308/9 X |
| 3,628,894 | 12/1971 | Ferguson et al. .................... 417/353 |
| 3,639,791 | 2/1972 | Jenkin................................ 308/9 X |
| 3,832,084 | 11/1972 | Maurice............................... 415/90 |

Primary Examiner—Carlton R. Croyle
Assistant Examiner—Thomas I. Ross
Attorney, Agent, or Firm—Spencer & Kaye

[57] ABSTRACT

A turbomolecular vacuum pump has a stator, a rotor having a vertical axis of rotation and disposed in the stator; a drive motor for rotating the rotor; a downwardly open, axially extending chamber in the rotor; a vertically upwardly oriented, stationarily supported stub shaft projecting into the rotor chamber; and axial, as well as radial gas bearings disposed within the rotor chamber for generating gas cushions between the rotor and the stub shaft.

8 Claims, 4 Drawing Figures

TURBOMOLECULAR VACUUM PUMP HAVING A GAS BEARING-SUPPORTED ROTOR

BACKGROUND OF THE INVENTION

This invention relates to a turbomolecular vacuum pump which has a rotor supported by means of air bearings.

A known turbomolecular vacuum pump of the above type, as disclosed, for example, in German Laid-Open Application (Offenlegungsschrift) No. 2,255,618, has a pump rotor which is affixed to the upper end of a vertically oriented shaft supported by means of gas bearings situated in a housing which, in turn, is disposed below the turbomolecular vacuum pump proper. Below the housing that accommodates the rotor shaft, there has to be arranged the drive for the turbomolecular vacuum pump. A significant disadvantage of a turbomolecular vacuum pump having a gas bearing — supported rotor according to the prior art resides in that its structure has an excessively large spatial requirement in the vertical direction.

SUMMARY OF THE INVENTION

It is an object of the invention to provide a turbomolecular vacuum pump with a stator and a gas bearing-supported rotor of significantly more compact construction when compared with prior art arrangements.

This object and others to become apparent as the specification progresses, are accomplished by the invention, according to which, briefly stated, there is provided a bell-shaped rotor which surrounds a vertically oriented stationary stub shaft and between the rotor and the stub shaft there are arranged an axial and at least one radial gas bearing. By virtue of the fact that the gas bearings are disposed within the bell-shaped rotor, the spatial requirement of the structure in a vertical direction may be maintained small.

DESCRIPTION OF THE PREFERRED EMBODIMENTS

Figure 1:
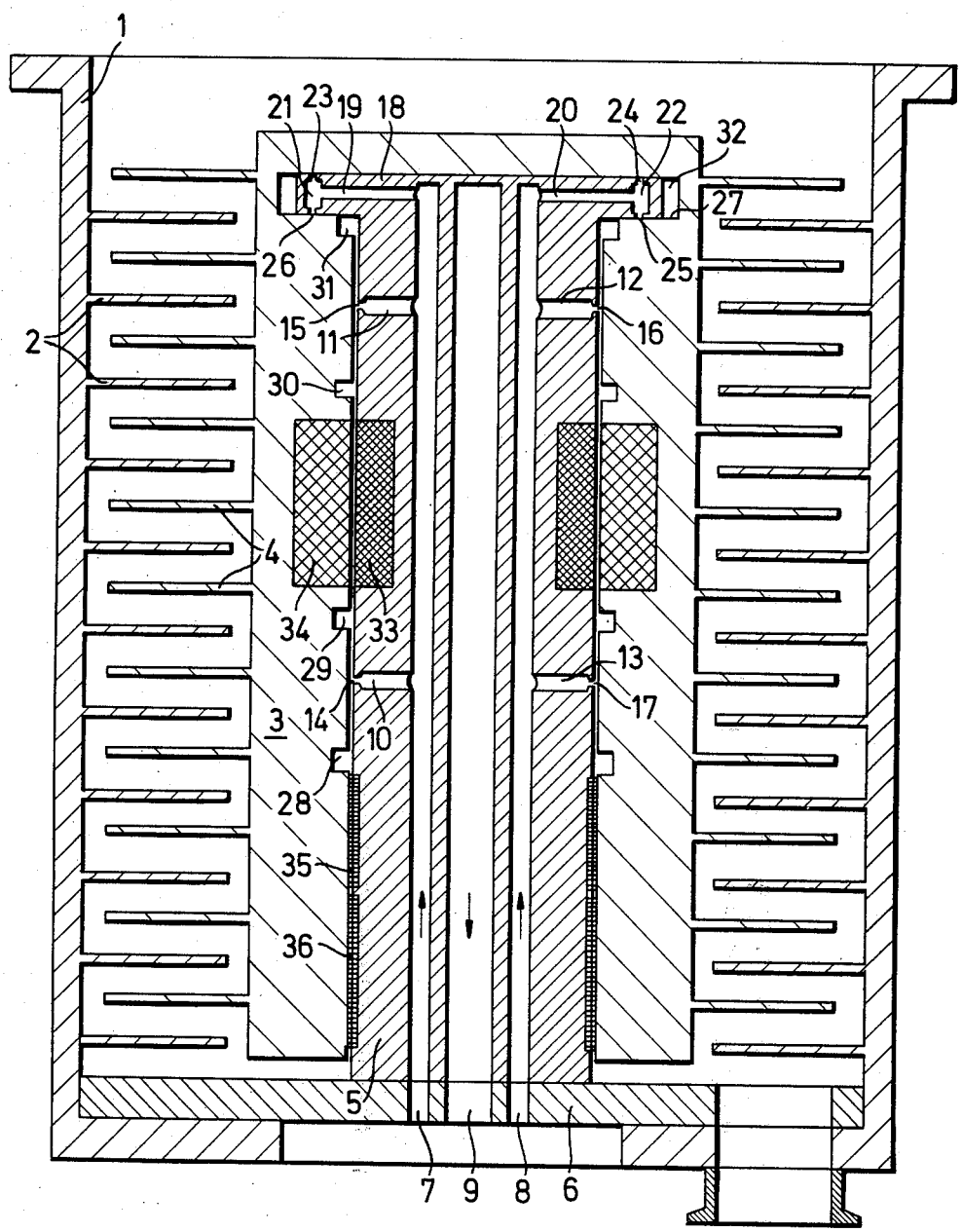
FIG. 1 is an axial sectional view of a first preferred embodiment of the invention.

Turning now to the Figures in general, there is shown a stator housing 1, to which there are affixed radially inwardly extending stator vanes 2, and a rotor 3, to which there are attached radially outwardly extending rotor vanes 4. The rotor 3 is hollow, that is, it has a downwardly open, axially extending cylindrical chamber which gives the rotor 3 a bell-shaped configuration. Into the rotor chamber there projects a stub shaft 5 which is fixedly mounted at its foot portion, in a manner not shown in detail, to a base plate 6 also serving to support the stator housing 1. The stub shaft 5 contains ports for the admission and withdrawal of gas required for the gas bearings that support the rotor 3. Thus, for this purpose, as shown in FIG. 1, in the stub shaft 5 there are provided two longitudinal gas intake channels 7 and 8 and further, a central gas outlet channel 9 which all pass through the base plate 6. From the gas channels 7 and 8 there extend channels 10, 11, 12 and 13 which terminate in radially outwardly oriented nozzles 14, 15, 16 and 17, respectively.

At its upper end, the stub shaft 5 has a collar-like enlargement 18, in the zone of which there extend two further channels 19 and 20 from the gas supply channels 7 and 8, respectively.

The channels 19 and 20 terminate in respective vertical bores 21 and 22 which are disposed in the collar-like enlargement 18. The ends of the bores 21 and 22 are provided with axially upwardly oriented nozzles 23 and 24, respectively, and with axially downwardly oriented nozzles 26 and 25, respectively. The radial distance of the nozzles 23–26 from the center of the stub shaft 5 is designed in such a manner that the nozzles are disposed in the rotor 3 within a cavity 27 accommodating the collar-like enlargement 18. For receiving the gas ejected from the nozzles 14–17 and 23–26 there are provided annular grooves 28, 29, 30 and 31 in the inner surface of the rotor 3 as well as an annular space 32 formed by the enlargement 18 and the cavity 27. The removal of the gas from the annular space 32 will be described later in connection with FIG. 2.

The drive of the rotor 3 is effected by means of a drive motor of the outer runner type. For this purpose, between the axially spaced annular grooves 29 and 30 in the stub shaft 5 there is embedded a laminated stator core 33 and in the rotor 3 there is embedded a laminated rotor core 34. The components 33 and 34 together form the drive motor which thus is disposed within the bell-shaped rotor 3. This positioning of the drive motor is advantageous, since the drive motor does not add to the vertical dimensions of the turbomolecular vacuum pump.

For insulating the lower gas bearing with respect to the pre-vacuumized zone of the turbomolecular vacuum pump, there are further provided molecular packings 35 and 36 which are known by themselves and which are embedded in the surface of the stub shaft 5.

Figure 2:
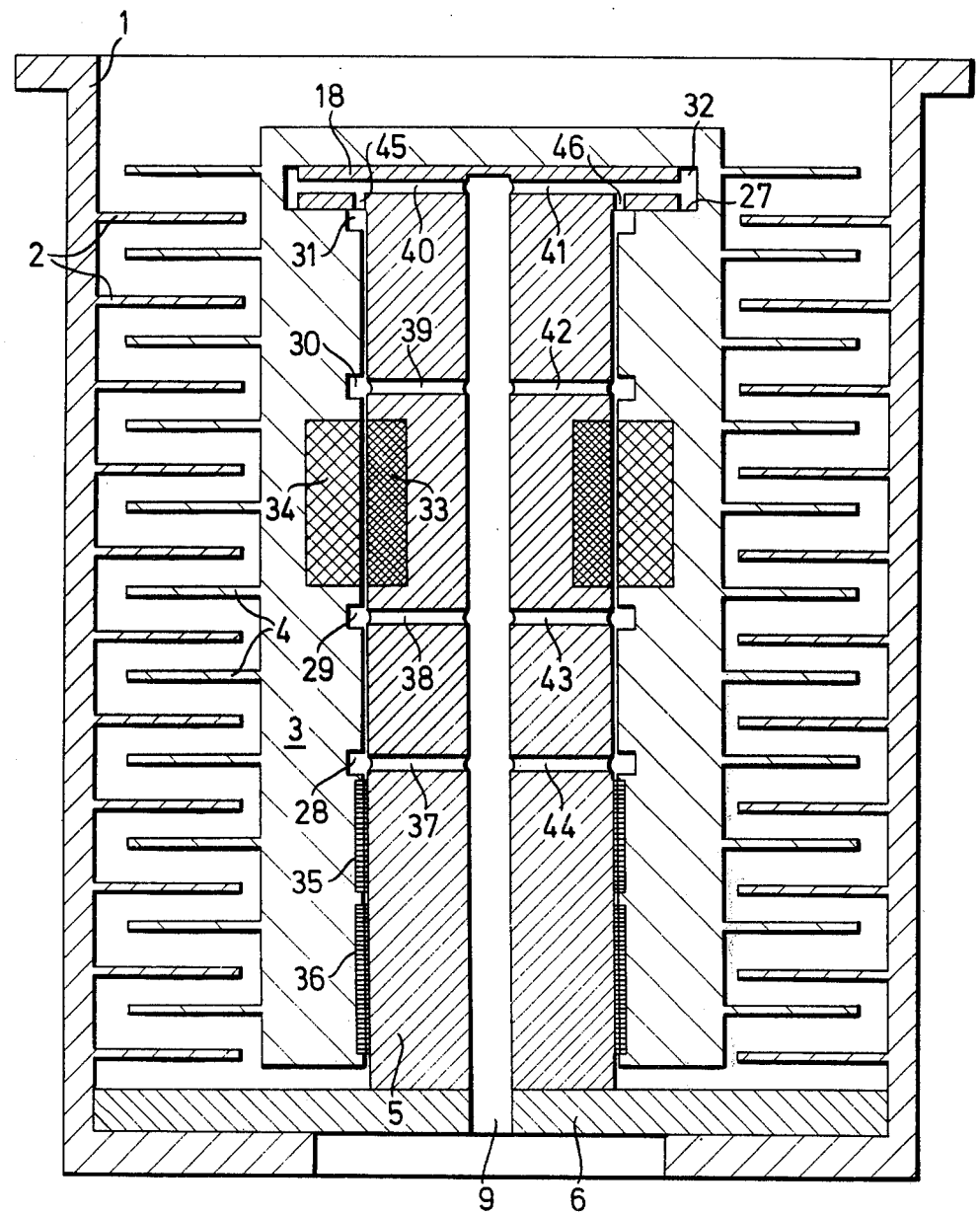
FIG. 2 is an axial sectional view of the first embodiment in a plane disposed 90° to the sectional plane of FIG. 1.

Turning now to FIG. 2 which illustrates the same embodiment in an axial sectional plane rotated 90° with respect to the sectional plane of FIG. 1, it is seen that the stub shaft 5 is further provided with radial ports 37, 38, 39, 40, 41, 42, 43 and 44 which withdraw the gas accumulated in the grooves 28, 29 and 30 and the annular space 32 and which all merge into the central gas return channel 9. For removing the gas from the groove 31 there are provided vertical ports 45 and 46 which merge into channels 40 and 41, respectively.

Figure 3:
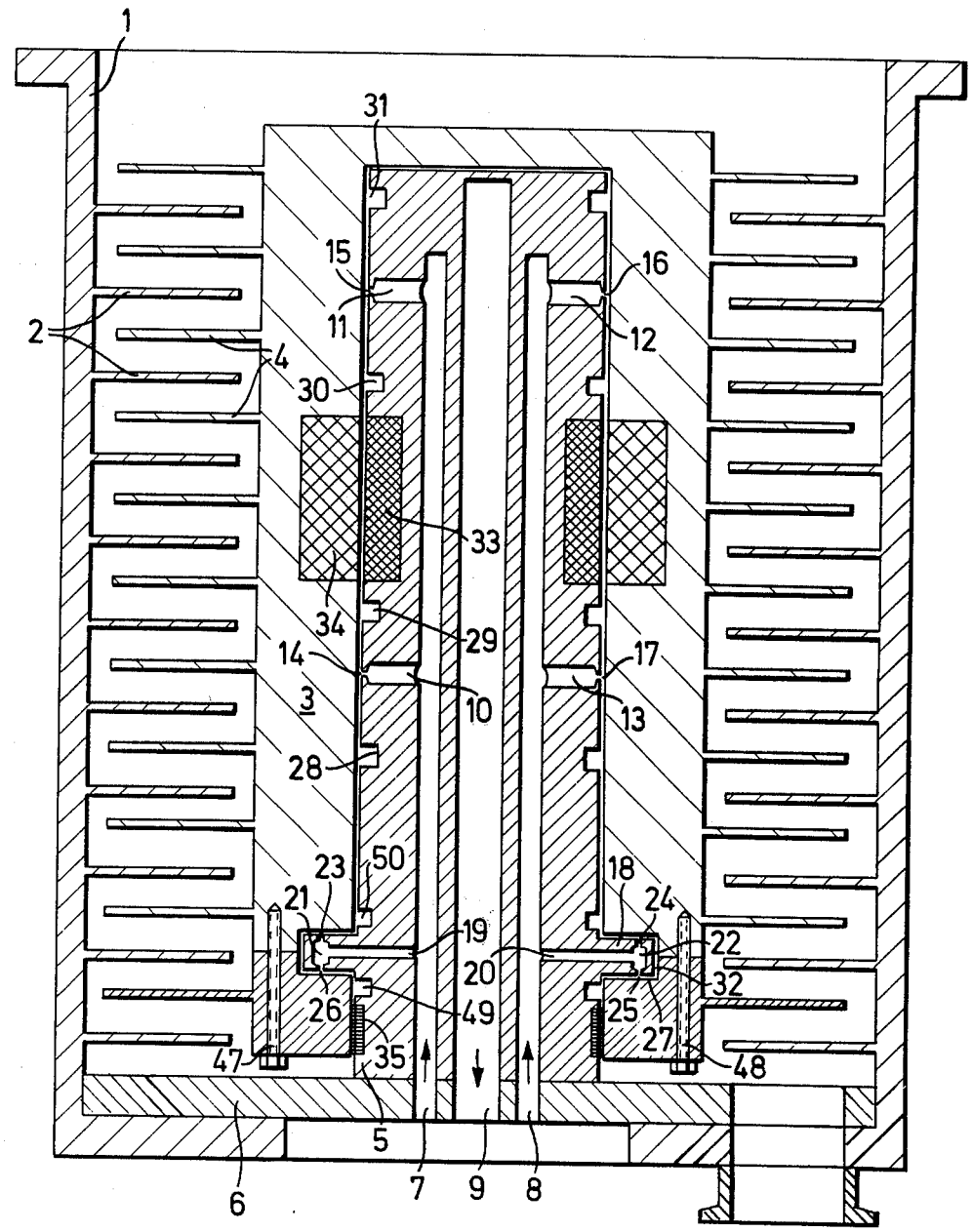
FIG. 3 is an axial sectional view of a second preferred embodiment of the invention.
Figure 4:
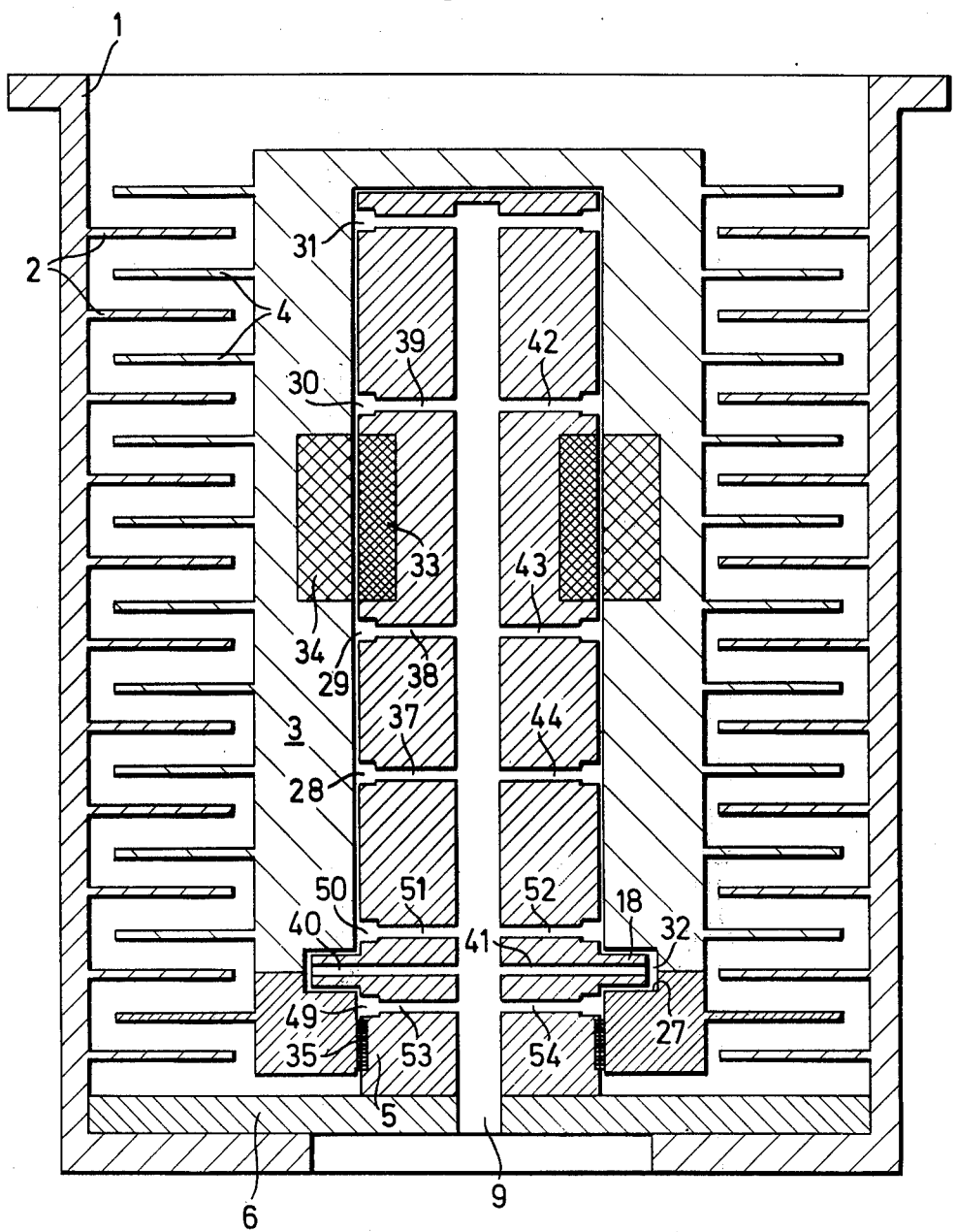
FIG. 4 is an axial sectional view of the second embodiment in a plane that is arranged 90° with respect to the sectional plane of FIG. 3.

Turning now to the embodiment illustrated in FIGS. 3 and 4, the collar-like enlargement 18 and the accommodating cavity 27 of the rotor 3 are arranged in the vicinity of the foot of the stub shaft 5. This arrangement facilitates the assembly or disassembly of the pump, since the rotor is divisible in the height of the cavity 27. The rotor components are fixedly held together in the assembled condition by means of bolts 47 and 48.

Further, in the embodiment according to FIGS. 3 and 4, the annular grooves 28, 29, 30 and 31 are provided in the stub shaft 5 since a cutting of grooves into the outer surface of the stub shaft is simpler than providing them in the inner surface of the rotor 3. In the outer surface of the stub shaft 5 there are further provided annular grooves 49 and 50 which are arranged, respectively, under and above the collar-like enlargement 18 and which serve for receiving the gas jet emitted by the nozzles 23, 24, 25 and 26. As it may be observed from FIG. 4, the grooves 49 and 50 communicate with the central gas return channel 9 by means of respective bores 51, 52, 53 and 54. The molecular packing 35 disposed below the axial bearing 23–26 is likewise embedded in the outer surface of the stub shaft 5 in order to avoid expensive machining of the inner surface of the rotor 3.

In the embodiments described and illustrated, the axial gas bearing effect is obtained by virtue of a gas cushion formed by the gas flowing between the upwardly or, as the case may be, downwardly directed nozzles 23–26 on the one hand, and the respective gas collecting spaces 31, 32 (or 32, 49 and 50 in FIG. 2), on the other hand. The upper and lower nozzles are dimensioned in such a manner that the weight of the rotor is balanced. The radial gas bearing effect is obtained by virtue of gas cushions formed by the gas streaming from the radially oriented nozzles 14–17 towards the annular grooves 28–31. These gas cushions prevent the rotor 3 from contacting the stub shaft 5 during rotation. A significant advantage of gas bearings of this type resides in the fact that they do not require lubricating oil so that the deterioration of the vacuum caused by oil vapors cannot occur.

It will be understood that the above description of the present invention is susceptible to various modifications, changes and adaptations, and the same are intended to be comprehended within the meaning and range of equivalents of the appended claims.

I claim:

1. A turbomolecular vacuum pump including a stator; a rotor having a vertical axis of rotation and disposed in the stator, comprising in combination:
   a. means defining a downwardly open, axially extending chamber in said rotor;
   b. a vertically oriented stub shaft projecting into said chamber and having a foot portion;
   c. means for fixedly supporting said stub shaft at said foot portion;
   d. first and second axially spaced radial gas bearings disposed within said chamber for generating gas cushions between said rotor and said stub shaft;
   e. an axial gas bearing disposed within said chamber for generating a gas cushion between said rotor and said stub shaft;
   f. means defining gas intake and gas outlet channels in said stub shaft for supplying gas to and withdrawing gas from said axial and radial gas bearings; and
   g. an electric motor of the outer runner type disposed between the two radial gas bearings and connected to said rotor.

2. A turbomolecular vacuum pump as defined in claim 1, further comprising
   h. a collar-shaped enlargement forming part of said stub shaft; and
   i. means defining a cavity in said rotor for accommodating said enlargement; said axial gas bearing means being situated in said enlargement for forming a gas cushion in said cavity.

3. A turbomolecular vacuum pump as defined in claim 2, said enlargement and said cavity being situated adjacent said foot portion of said stub shaft.

4. A turbomolecular vacuum pump as defined in claim 1, further comprising means defining radially outwardly oriented nozzles in said stub shaft; means maintaining communication between each said nozzle, on the one hand, and the gas intake channels, on the other hand; means defining circumferential annular grooves adjacent said nozzles; and means maintaining communication between each said groove, on the one hand, and the gas outlet channels, on the other hand; said nozzles and said grooves forming the radial gas bearings.

5. A turbomolecular vacuum pump as defined in claim 2, further comprising
   j. means defining axially upwardly and downwardly directed nozzles in said enlargement;
   k. means maintaining communication between each said nozzle, on the one hand, and the gas intake channels, on the other hand;
   l. means defining circumferential annular grooves adjacent said nozzles; and
   m. means maintaining communication between each said groove, on the one hand, and the gas outlet channels, on the other hand; said nozzles and said grooves forming said axial gas bearing means.

6. A turbomolecular vacuum pump as defined in claim 4, said stub shaft having an outer surface; said circumferential annular grooves being provided in said outer surface.

7. A turbomolecular vacuum pump as defined in claim 5, said stub shaft having an outer surface; said circumferential annular grooves being provided in said outer surface.

8. A turbomolecular vacuum pump as defined in claim 1, further comprising molecular packing means disposed between the gas bearing means, on the one hand, and the opening of said chamber, on the other hand, for sealing the gas bearings means with respect to a pre-vacuum zone of said pump.

* * * * *